United States Patent Office 3,250,788
Patented May 10, 1966

3,250,788
PROCESS FOR MAKING 4-(4-HYDROXYBUTYL)-2-VINYL-1,3-DIOXOLANE
Ben W. Kiff, Ona, and Joe T. Adams, St. Albans, W. Va., assignors to Union Carbide Corporation, a corporation of New York
No Drawing. Filed Aug. 1, 1962, Ser. No. 213,866
3 Claims. (Cl. 260—340.9)

The present invention relates to organic processes, and in particular, is concerned with an improved catalytic process for the production of the cyclic acetal 4-(4-hydroxybutyl)-2-vinyl-1,3-dioxolane via the reaction of acrolein and 1,2,6-hexanetriol. Such a reaction can be illustrated by the following general equation:

$$CH_2=CHCHO + CH_2OH(CH_2)_3CHOHCH_2OH \longrightarrow$$

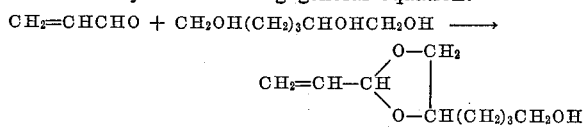

Heretofore, the reaction of acrolein and 1,2,6-hexanetriol producing 4-(4-hydroxybutyl)-2-vinyl-1,3-dioxolane has conventionally been carried out by bringing the reactants into admixture in contact with a catalytic amount of a strong organic acid such as benzenesulfonic acid, toluenesulfonic acid or oxalic acid, etc., or a mineral acid, or sulfuric acid, etc., either alone or in combination with a suitable carrier such as silica gel, alumina gel, diatomaceous earth, or the like. In these processes, reaction temperatures above 50° C. are generally employed. Moreover, during the course of the reaction, water formed as a by-product is nessarily continuously removed if a substantial degree of conversion is to be obtained. To this end, an azeotroping agent, such as benzene, xylene, hexane, or the like, is also ordinarily incorporated in the reaction mixture, and sufficient heat is applied to the mixture to insure driving off the water of reaction as an azeotrope.

In addition, since the reaction temperatures generally employed by the prior art are approximately at, or preferably considerably above, the boiling point of acrolein, viz., 52° C., it is also necessary to provide a means for handling a reflux stream of acrolein during the reaction. This is of particular importance in view of the extreme tendency of acrolein to polymerize in columns wherein vapor and liquid phases of the monomer are in contact with each other.

At the conclusion of the reaction, the acidic catalyst is usually neutralized by the addition of a suitable base, and the acetal product recovered by distillation. The neutralization of the catalyst precludes the decomposition of the product during distillation as might otherwise occur in an acidic environment. Any unreacted triol remaining after the distillation can be separated from the salt produced by the neutralization of the acidic catalyst and recycled for further use.

Thus, it can be seen that, while 4-(4-hydroxybutyl)-2-vinyl-1,3-dioxolane has heretofore been produced by the reaction of acrolein and 1,2,6-hexanetriol, prior art processes in this regard have entailed somewhat complex and/or inconvenient operations.

Unexpectedly, it has now been found that an improved process for the production of 4-(4-hydroxybutyl)-2-vinyl-1,3-dioxolane can be realized by reacting 1,2,6-hexanetriol with at least a stoichiometric amount of acrolein, at a temperature of not more than about 50° C., and in contact with a catalytic amount of an acid-treated sub-bentonite clay catalyst. In this manner, several distinct advantages accrue.

Firstly, under the milder reaction conditions employed, the polymerization of acrolein is substantially precluded, as is the necessity for handling a reflux stream of the monomer. At the same time, there is no need to remove water formed during the reaction by azeotropic distillation in order to obtain a significant degree of conversion, for the desired cyclic acetal is produced in high yields and with particular high efficiency in the absence of such a process step. Indeed, higher efficiencies than those heretofore obtained by prior art processes are usually realized through the practice of the present invention. In addition, the catalysts contemplated by this invention can readily be removed from the crude reaction product by filtration, leaving behind a neutral liquid from which the acetal product can conveniently be recovered by distillation without deterioration. Any unreacted triol remaining can then be directly recycled for further use.

More particularly, the catalysts contemplated by this invention are the compositions made by treating, i.e., activating, the so-called sub-bentonite clays with acid. This type of clay is characterized by rapid slacking and only slight swelling when placed in water. Montmorillonite is the chief mineral in the clay. The base exchange positions of the clay are generally occupied by calcium and magnesium ions. Activated clays, and particularly the activated sub-bentonite clays, are described in the Encyclopedia of Chemical Technology, volume 4 (1949), pages 53–57. The process of acid-treating and making the activated clay is described on page 55 of this encyclopedia. The process of making the activated clay consists essentially of mixing a clay which is susceptible to high acid activation, such as the sub-bentonite clays, with enough water to form a slurry. A mineral acid, preferably sulfuric acid or hydrochloric acid, is then added to the slurry in an amount corresponding to a proportion of about 35 percent by weight based upon the weight of the clay. The resulting mixture is thereafter contacted with live steam for 5 to 6 hours. Finally, the treated clay is separated, washed with water until substantially free of acid, dried and ground. A commercial product of the acid-treated sub-bentonite clays made in this manner, and which have been found particularly useful in the present invention, is sold under the name of "Super Filtrol."

It was indeed unexpected that such catalysts would selectively catalyze the reaction of acrolein and 1,2,6-hexanetriol to the desired cyclic acetal since such catalysts have heretofore been known to catalyze the reaction of polyhydric alcohols with compounds possessing terminal ethylenically unsaturated groups to produce liquid resins containing a multiplicity of high boiling compounds. In accordance with the process of this invention, however, such resins or high-boiling compounds are not obtained or formed to any substantial extent. It was also unexpected that the reaction of acrolein and 1,2,6-hexanetriol could be catalyzed under the mild reaction conditions employed to produce the desired cyclic acetal in high yields and particularly high efficiencies, especially when the water formed as a by-product is not removed during the course of the reaction.

The acid-treated sub-bentonite clays can be employed in the process of this invention in any catalytic amount, i.e., any amount sufficient to catalyze the reaction of 1,2,6-hexanetriol with acrolein to produce 4-(4-hydroxybutyl)-2-vinyl-1,3-dioxolane. Such amount can vary broadly and is readily determined by one skilled in the art in light of this disclosure. Particularly good results can be obtained, for instance using the catalyst in a proportion of from about 0.2 percent to about 10 percent by weight, and preferably from about 0.5 percent to about 4 percent by weight, based upon the total weight of the reactants, while catalytic amounts outside this range can also be employed.

The proportion of acrolein to 1,2,6-hexanetriol is of importance to the process of this invention in that at least a stoichiometric amount of acrolein, i.e., a proportion of at least 1 mole of acrolein per mole of 1,2,6-hexanetriol, is ordinarily used. Preferably, acrolein is employed in an excess over the stoichiometric amount. The excess acrolein aids in helping to shift the reaction equilibrium toward the formation of the desired cyclic acetal, and is especially expedient under the mild reaction conditions employed. Thus, a proportion of from about 2 to 5 moles of acrolein per mole of 1,2,6-hexanetriol is best employed. Higher proportions of up to about 10 or more moles of acrolein per mole of 1,2,6-hexanetriol can also be used, although attended by the necessity for recovering and recycling considerable quantities of unreacted acrolein in a continuous process.

The reactants and catalysts can be brought into admixture in any convenient manner. Preferably the triol and catalyst are admixed and acrolein is subsequently introduced to the mixture. Alternatively, the triol can be fed to an acrolein-catalyst mixture, etc.

The reaction mixture, including the catalyst, is then heated at a temperature of from about 30° C. to about 50° C., and preferably from about 40° C. to about 47° C., to produce the desired cyclic acetal. The actual reaction period can vary broadly and can readily be determined by one skilled in the art in light of this disclosure. Good results can be obtained, for instance, using reaction periods of from about 2 to about 6 hours. However, this period can be also extended considerably without significant loss in efficiency. Moreover, the process of this invention is preferably conducted at atmospheric pressure as a matter of convenience, while somewhat higher or lower pressures are also operable.

Upon completion of the reaction, the acetal product can be recovered in any convenient manner. Preferably, the catalyst is initially removed by filtration. Unreacted acrolein and the water of reaction are then distilled off as a forecut, after which the acetal product is recovered as a distillate under reduced pressure. Other separation techniques may also occur to those skilled in the art, and can be employed to recover the acetal product.

The process of this invention can be illustrated further by the following specific examples of its practice.

*Example 1*

To a 2-liter reaction flask equipped with stirrer and thermometer, there were charged 875 grams of 96 percent acrolein (15 moles) and 30 grams of Super Filtrol. While the temperature of this mixture was maintained in the range of 42° C. to 44° C., 670 grams (5 moles) of 1,2,6-hexanetriol were fed thereto dropwise, accompanied by stirring, over a period of 3 hours. Stirring was continued for another hour while the temperature of the reaction mixture was maintained at about 46° C. The crude reaction product was then filtered to remove the catalyst. The filtrate was transferred to a distilling flask and resolved by distillation. Unreacted acrolein and the water of reaction were removed as a forecut. Thereafter, 652 grams of 4-(4-hydroxybutyl)-2-vinyl-1,3-dioxolane, boiling at 127°/5 mm., were recovered as the main product. The material remaining in the kettle was further distilled to obtain 131 grams of unreacted 1,2,6-hexanetriol. The yield to 4-(4-hydroxybutyl)-2-vinyl-1,3-dioxolane based upon the amount of 1,2,6-hexanetriol charged was 75.8 percent. The net efficiency was 94.2 percent, based upon the triol, i.e.:

Efficiency (percent) =

$$\frac{\text{Moles of triol converted to acetal}}{\text{Moles of triol charged} - \text{moles of unreacted triol recovered}} \times 100$$

*Examples 2 to 4*

The following experiments were conducted in the manner and under similar reaction conditions to those described in Example 1 using, however, different amounts of Super Filtrol catalyst. The amount of catalyst, indicated in percent, is based upon the total weight of the reactants, the yield and efficiency are based upon the triol.

| Example No. | Percent Super Filtrol | Percent Yield | Percent Efficiency |
|---|---|---|---|
| 2 | 1 | 63.6 | 88.3 |
| 3 | 4 | 67.6 | 93.4 |
| 4 | 5 | 62 | 81 |

*Examples 5 to 7*

The following experiments were conducted in the manner and under similar reaction conditions to those described in Example 1 using, however, different molar ratios of acrolein to 1,2,6-hexanetriol.

| Example No. | Ratio, Acrolein/Triol | Percent Yield | Percent Efficiency |
|---|---|---|---|
| 5 | 1/1 | 49.4 | 88.0 |
| 6 | 1.5/1 | 60.3 | 89.0 |
| 7 | 2/1 | 64.8 | 89.7 |

*Example 8*

For comparison purposes, 4-(4-hydroxybutyl)-2-vinyl-1,3-dioxolane was produced by the reaction of acrolein and 1,2,6-hexanetriol in accordance with known processes as follows. To a distillation flask connected to a distillation column 1 inch in diameter by 4 feet in length and equipped with a decanting head, there were charged 296 grams of 95 percent acrolein, 670 grams of 1,2,6-hexanetriol, 5 grams of oxalic acid (catalyst), 5 grams of hydroquinone (polymerization inhibitor), and 375 grams of hexane (azeotroping agent). The resulting mixture was then refluxed for a period of 17 hours at a kettle temperature in the range of 76° C. to 78° C., accompanied by the removal of water as an azeotropic distillate with hexane, until water could no longer be collected in this manner. Upon conventional distillation of the crude reaction product there were obtained 241 grams of the desired cyclic acetal, 188 grams of unreacted 1,2,6-hexanetriol, and 441 grams of a high-boiling residue. Thus, the yield was only 28 percent and the efficiency was only 39 percent, calculated as described above.

What is claimed is:

1. A process for the production of 4-(4-hydroxybutyl)-2-vinyl-1,3-dioxolane which comprises bringing acrolein and 1,2,6-hexanetriol into admixture in a proportion of at least one mole of said acrolein per mole of said 1,2,6-hexanetriol, and in contact with a catalytic amount of an acid-treated sub-bentonite clay; and heating the resultant mixture at a temperature of from about 30° C. to about 50° C. to produce said 4-(4-hydroxybutyl)-2-vinyl-1,3-dioxolane.

2. A process for the production of 4-(4-hydroxybutyl)-2-vinyl-1,3-dioxolane which comprises bringing acrolein and 1,2,6-hexanetriol into admixture in a proportion of greater than one to about 10 moles of said acrolein per mole of said 1,2,6-hexanetriol, and in contact with an acid-treated sub-bentonite clay in a proportion of form about 0.2 percent to about 10 percent by weight of said clay based upon the total weight of said acrolein and said 1,2,6-hexanetriol; and heating the resultant mixture at a temperature of from about 30° C. to about 50° C. to produce said 4-(4-hydroxybutyl)-2-vinyl-1,3-dioxolane.

3. A process for the production of 4-(4-hydroxybutyl)-2-vinyl-1,3-dioxolane which comprises bringing acrolein and 1,2,6-hexanetriol into admixture in a proportion of from about 2 to about 5 moles of said acrolein per mole of said 1,2,6-hexanetriol, and in contact with an acid-treated sub-bentonite clay in a proportion of from about 0.5 percent to about 4 percent by weight of said clay based upon the total weight of said acrolein and said 1,2,6-hexanetriol; and heating the resultant mixture at a temperature of from about 40° C. to about 47° C. to produce said 4-(4-hydroxybutyl)-2-vinyl-1,3-dioxolane.

References Cited by the Examiner

UNITED STATES PATENTS 3,010,918   11/1961   Ikeda _____ 260—340.7
3,014,924   12/1961   Brachman _____ 260—340.9

FOREIGN PATENTS 852,438   10/1960   Great Britain.

OTHER REFERENCES

Lambert: Ind. Chim. Belge, vol. 26, pp. 1012–1020 (1961).

IRVING MARCUS, *Primary Examiner.*

NICHOLAS S. RIZZO, WALTER A. MODANCE,
*Examiners.*